United States Patent
Zeng

(10) Patent No.: US 10,438,330 B2
(45) Date of Patent: Oct. 8, 2019

(54) METHOD AND DEVICE FOR COMPENSATING DEAD PIXELS OF IMAGE, AND NON-TRANSITORY COMPUTER-READABLE STORAGE MEDIUM

(71) Applicant: GUANGDONG OPPO MOBILE TELECOMMUNICATIONS CORP., LTD., Dongguan, Guangdong (CN)

(72) Inventor: Yuanqing Zeng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 149 days.

(21) Appl. No.: 15/808,078

(22) Filed: Nov. 9, 2017

(65) Prior Publication Data
US 2018/0150942 A1    May 31, 2018

(30) Foreign Application Priority Data
Nov. 30, 2016 (WO) ................ PCT/CN2016/108081

(51) Int. Cl.
*G06K 9/40* (2006.01)
*G06T 5/00* (2006.01)
(Continued)

(52) U.S. Cl.
CPC ............ *G06T 5/005* (2013.01); *H04N 5/367* (2013.01); *H04N 9/04557* (2018.08); *G06T 2207/20021* (2013.01); *G06T 2207/20172* (2013.01)

(58) Field of Classification Search
CPC . G06T 2207/20021; G06T 2207/20172; G06T 5/005; H04N 9/04557; H04N 5/367
See application file for complete search history.

(56) References Cited

U.S. PATENT DOCUMENTS

| 6,118,846 A | 9/2000 | Liu |
| 2003/0117507 A1 | 6/2003 | Kehtarnavaz et al. |

(Continued)

FOREIGN PATENT DOCUMENTS

| CN | 1655588 A | 8/2005 | |
| CN | 102625133 | * 8/2012 | ............. H04N 17/00 |

(Continued)

OTHER PUBLICATIONS

European Search Report in European application No. 17201395.5, dated Apr. 5, 2018.

*Primary Examiner* — Amara Abdi

(57) ABSTRACT

A device and method for compensating dead pixels of an image includes estimating brightness changing trends at two sides of a dead pixel in image data and determining dead pixel brightness compensation values corresponding to the two sides of the dead pixel. Difference values between the brightness changing trends and between the dead pixel brightness compensation values at the two sides of the dead pixel along each predetermined direction is determined and a weighting factor corresponding to the difference values is determined. The dead pixel brightness compensation values corresponding to the two sides of the dead pixel along each predetermined direction are subjected to a weighting calculation based on the weighting factor to obtain a compensation result for the dead pixel.

16 Claims, 8 Drawing Sheets

(51) Int. Cl.
*H04N 5/367* (2011.01)
*H04N 9/04* (2006.01)

(56) References Cited

U.S. PATENT DOCUMENTS

| | | |
|---|---|---|
| 2005/0030394 A1 | 2/2005 | Mendis et al. |
| 2005/0047658 A1* | 3/2005 | Kita .................... H04N 1/4097 |
| | | 382/167 |
| 2005/0195297 A1 | 9/2005 | Kita |
| 2006/0012841 A1 | 1/2006 | Tsukioka |
| 2006/0176935 A1 | 8/2006 | Hiroki |
| 2007/0030365 A1* | 2/2007 | Jerdev .................... H04N 5/367 |
| | | 348/241 |
| 2009/0141999 A1 | 6/2009 | Peng et al. |
| 2009/0245683 A1 | 10/2009 | Sasaki |
| 2011/0102624 A1 | 5/2011 | Hashizume |
| 2013/0038773 A1 | 2/2013 | Honda |
| 2013/0051665 A1* | 2/2013 | Shinozaki ................ G06T 5/00 |
| | | 382/167 |
| 2013/0329098 A1* | 12/2013 | Lim ........................ H04N 9/64 |
| | | 348/246 |
| 2014/0125847 A1 | 5/2014 | Yasuda |
| 2015/0170376 A1* | 6/2015 | Bishop .................... G06T 5/005 |
| | | 382/167 |
| 2016/0033796 A1 | 2/2016 | Qin et al. |

FOREIGN PATENT DOCUMENTS

| | | | | |
|---|---|---|---|---|
| CN | 102625133 A | | 8/2012 | |
| CN | 105430385 A | | 3/2016 | |
| JP | 2006180210 A | | 7/2006 | |
| JP | 2011120202 A | | 6/2011 | |
| JP | 2013-038654 | * | 2/2013 | ............ H04N 9/045 |
| JP | 2013038654 A | | 2/2013 | |
| JP | 2013055640 A | | 3/2013 | |
| JP | 2016-019245 A | | 2/2016 | |
| TW | 200703128 | * | 1/2007 | ............ H04N 9/646 |
| TW | 200703128 A | | 1/2007 | |
| TW | 200924507 A | | 6/2009 | |

\* cited by examiner

METHOD AND DEVICE FOR COMPENSATING DEAD PIXELS OF IMAGE, AND NON-TRANSITORY COMPUTER-READABLE STORAGE MEDIUM

CROSS REFERENCE TO RELATED APPLICATION

This application claims priority to PCT Application NO. PCT/CN2016/108081 filed on Nov. 30, 2016, the disclosures of which are incorporated herein by reference in their entirety.

BACKGROUND

1. Field of the Disclosure

The present disclosure relates to imaging processing technology, and more particularly, to a method and device for compensating dead pixels of an image, and a non-transitory computer-readable storage medium.

2. Description of the Related Art

With rapid development of science and manufacture technologies, image sensors have an increasing number of pixel dots. A large number of pixel dots are inevitably damaged and produce dead pixels in manufacturing. In the image sensor, the dead pixels generally relate to phase pixel dots. Under a same illumination, brightness of the phase pixel dots will be higher than or lower than that of other pixel dots due to coating or because the phase pixel dots are not coated. The dead pixels existing in the image sensor itself bring greatly influence on image quality. This dramatically reduces the image quality. Correcting the dead pixels includes detection and compensation, which can improve image quality.

Nowadays, image sensor quality is managed based on number of the dead pixels. If the number of the dead pixels exceeds a predetermined threshold, a corresponding product cannot be delivered. Another parameter used to manage the dead pixels is a threshold that the number of the dead pixels per unit area cannot exceed. However, even though such a management approach is used, manufactured image sensors still have dead pixels. Existence of the dead pixels will dramatically reduce the image quality.

SUMMARY

At least one embodiment of the present disclosure provides a method for compensating dead pixels of an image. The method includes obtaining a plurality of predetermined directions across a dead pixel in image data; estimating brightness changing trends at two sides of the dead pixel for each predetermined direction, and determining dead pixel brightness compensation values corresponding to the two sides of the dead pixel along a corresponding predetermined direction; determining a first difference between the brightness changing trends at the two sides of the dead pixel along each predetermined direction and a second difference between the dead pixel brightness compensation values at the two sides of the dead pixel along each predetermined direction; according to the first difference and the second difference obtained along each predetermined direction, determining a weighting factor corresponding to the corresponding predetermined direction; and subjecting the dead pixel brightness compensation values corresponding to the two sides of the dead pixel along each predetermined direction to a weighting calculation based on the weighting factor to obtain a compensation result for the dead pixel.

At least one embodiment of the present disclosure provides a device for compensating dead pixels of an image. The device includes a processor; and a memory connected with the processor, the memory comprising a plurality of program instructions executable by the processor configured to execute a method. The method includes obtaining a plurality of predetermined directions across a dead pixel in image data; estimating brightness changing trends at two sides of the dead pixel for each predetermined direction; determining dead pixel brightness compensation values corresponding to the two sides of the dead pixel along a corresponding predetermined direction for each predetermined direction; determining a first difference between the brightness changing trends at the two sides of the dead pixel along each predetermined direction and a second difference between the dead pixel brightness compensation values at the two sides of the dead pixel along each predetermined direction; according to the first difference and the second difference obtained along each predetermined direction, determining a weighting factor corresponding to the corresponding predetermined direction; and subjecting the dead pixel brightness compensation values corresponding to the two sides of the dead pixel along each predetermined direction to a weighting calculation based on the weighting factor to obtain a compensation result for the dead pixel.

At least one embodiment of the present disclosure provides a non-transitory computer-readable storage medium storing one or more instructions, which are executable by a device to implement a method for compensating dead pixels of an image. The method includes estimating brightness changing trends at two sides of a dead pixel for each predetermined direction in image data that is to be compensated, and determining dead pixel brightness compensation values corresponding to the two sides of the dead pixel along a corresponding predetermined direction; determining a first difference between the brightness changing trends at the two sides of the dead pixel along each predetermined direction and a second difference between the dead pixel brightness compensation values at the two sides of the dead pixel along each predetermined direction; according to the first difference and the second difference obtained along each predetermined direction, determining a weighting factor corresponding to the corresponding predetermined direction; and subjecting the dead pixel brightness compensation values corresponding to the two sides of the dead pixel along each predetermined direction to a weighting calculation based on the weighting factor to obtain a compensation result for the dead pixel.

BRIEF DESCRIPTION OF THE DRAWINGS

The above and/or additional aspects and advantages of the present disclosure will be apparent and readily understood in the following descriptions of the embodiments in conjunction with the drawings.

DETAILED DESCRIPTION OF THE PREFERRED EMBODIMENTS

The embodiments of the present disclosure will be described in detail below. The embodiments are illustrated in the appending drawings, in which the same or similar reference numbers are throughout referred to as the same or similar components or the components having the same or similar functions. The embodiments described below with reference to the appending drawings are exemplary and are merely used to illustrate the present disclosure, and should not be construed as limitations of the present disclosure.

The dead pixel compensation schemes provided in the embodiments of the present disclosure may be deployed at a terminal apparatus having an image sensor. It is noted that there are various types of terminal apparatuses, for example, cell phones, tablets, and smart wearable devices. Referring to the appending drawings, a method, a device, and an electronic apparatus for compensating dead pixels of an image provided in accordance to embodiments of the present disclosure are described below.

In the following embodiments of the present disclosure, the present disclosure is illustrated using the data generated by a Bayer image sensor as an example, but is not limited to the Bayer image sensor in practical applications. The data generated by any other image sensor are applicable as well.

The most outstanding feature of wavefront image sensors is that a pixel providing phase information is also photosensitive and the resulting brightness varies with ambient brightness, and is generally higher in light sensitivity as compared to an ordinary pixel (different micro lenses are used in order to increase accuracy of the phase information).

Figure 1:
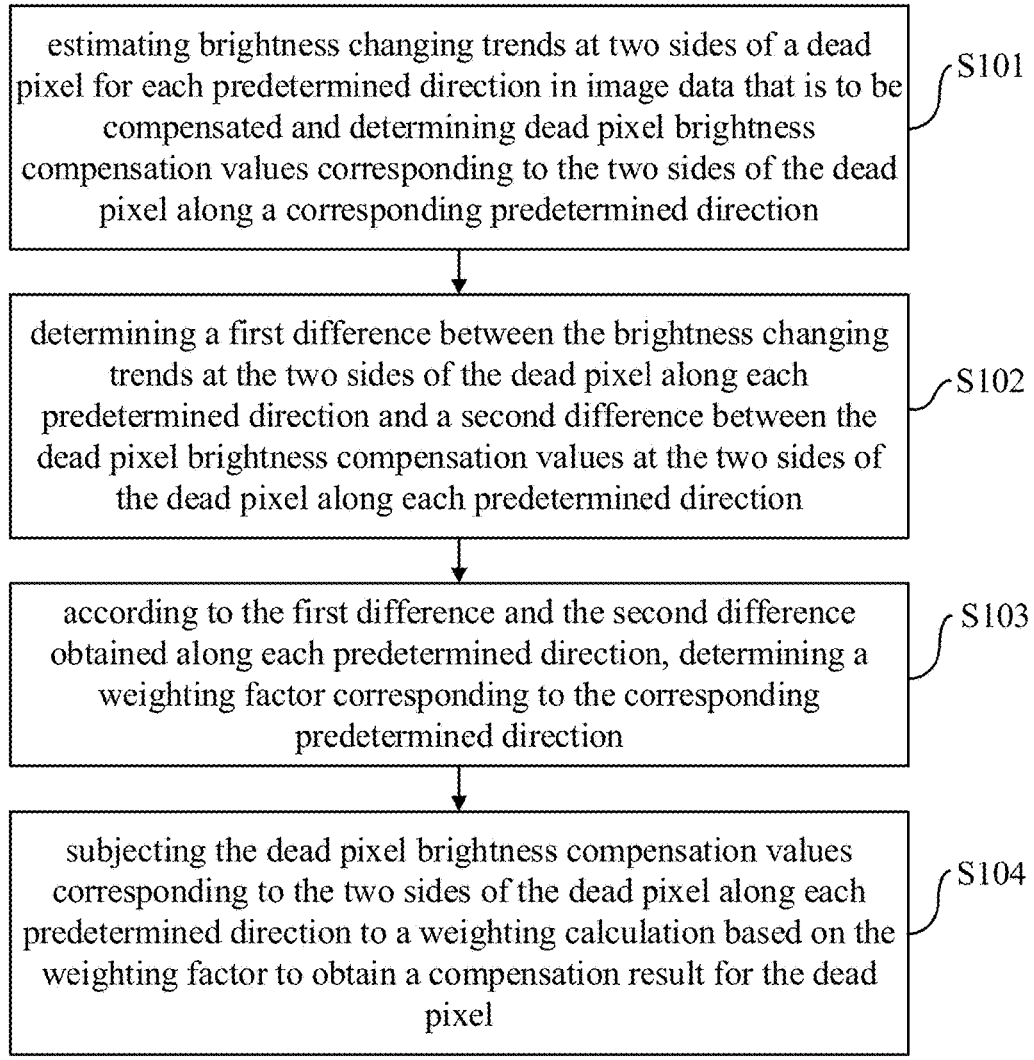
FIG. 1 is a flowchart of a method for compensating dead pixels of an image in accordance with an embodiment of the present disclosure.

FIG. 1 is a flowchart of a method for compensating dead pixels of an image in accordance with an embodiment of the present disclosure.

As shown in FIG. 1, the dead pixel compensation method of the embodiment of the present disclosure includes actions at the following blocks.

At Block S101, brightness changing trends are estimated at two sides of a dead pixel for each predetermined direction in image data that is to be compensated, to determine dead pixel brightness compensation values corresponding to the two sides of the dead pixel along each corresponding predetermined direction.

In the embodiments of the present disclosure, the image data that is to be compensated can be the resulting data from the image sensor. The image sensor itself may have some damaged points, and accordingly the resulting data from the image sensor may have pixel dots with low light sensitivity, which can be deemed as dead pixels in the resulting data. That is to say, the dead pixels in the image data can be determined based on the damaged points of the image sensor. Alternatively, in another embodiment of the present disclosure, the dead pixels in the image data can be determined by performing dead pixel detection on the image data.

In order to compensate a dead pixel in the image data, an actual compensation value for the dead pixel can be determined according to the changing trends of brightness of other pixel dots around the dead pixel along each predetermined direction, and the difference between the brightness changing trends at the two sides of the dead pixel and the difference between the brightness compensation values at the two sides of the dead pixel, in which the dead pixel is served as a split point.

In an embodiment of the present disclosure, the aforesaid predetermined direction can be carried out by a plurality of predetermined directions deployed according the following rules. For example, eight directions are constructed by taking the dead pixel as a center and extending outward from the center, in which every two directions are opposite to each other. Accordingly, every two opposite directions can be combined into one predetermined direction having two opposite sides, that is, four predetermined directions in total.

Figure 2A:
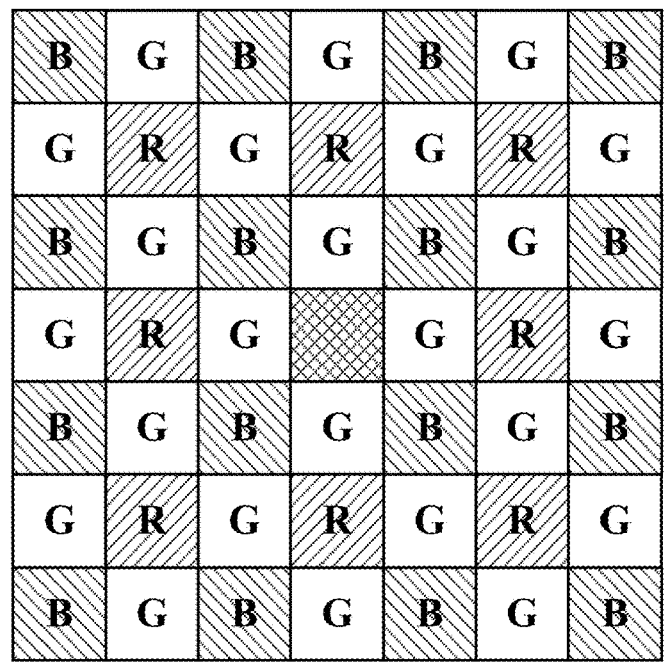
FIG. 2a is a schematic diagram illustrating the resulting data from an image sensor in accordance with an embodiment of the present disclosure.
Figure 2B:
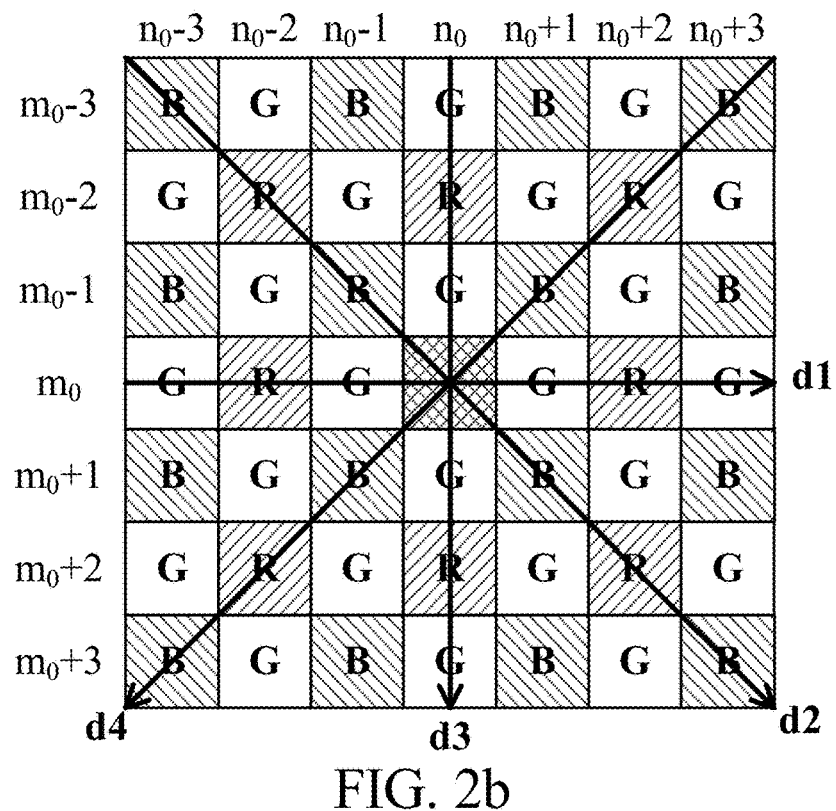
FIG. 2b is a schematic diagram illustrating the resulting data from an image sensor in accordance with another embodiment of the present disclosure.

FIG. 2a is a schematic diagram illustrating the resulting data from an image sensor in accordance with an embodiment of the present disclosure. For instance, as shown in FIG. 2a, a 7×7 region is depicted by taking the dead pixel as a center. Dead pixel compensation can be carried out using the brightness of pixel dots in this region except the dead pixel. In FIG. 2b, in the 7×7 region, the eight directions extending outward from the center (i.e., the dead pixel) include not only pixel dots having the same channel (e.g., R channel) as the dead pixel but also pixel dots having the channels (e.g., G channel and B channel) different from the dead pixel. Accordingly, if the dead pixel exists in the 7×7 region, the pixel dots having the channels different from the dead pixel can not only serve perfectly well as a brightness reference for the dead pixel, but also be used to estimate correction of the dead pixel together with the brightness of the pixel dots having the same channel as the dead pixel.

It is noted that for ease of illustration of the schemes of the present disclosure, the embodiments of the present disclosure are illustrated merely using "the 7×7 region taking the dead pixel as a center" to explain the dead pixel compensation. In practical applications, the size of the region is not limited, and a pixel region described with a certain area can also be used to compensate the dead pixel, for example, "a 9×9 region taking the dead pixel as a center" and "a 10×10 region taking the dead pixel as a center", which can be chosen based on actual needs and the present disclosure are not limited thereto.

It is noted that adjacent points are referred to as the pixel dots directly adjacent to the pixel dot, for example, the pixel dots in a region M in the figures except the dead pixel.

In an embodiment, four vectors can be established corresponding to the aforesaid four directions. In the 7×7 region, brightness of the dead pixel and each pixel dot around the dead pixel is obtained and saved to a corresponding vector based on the direction that each pixel dot is located along.

For the aforesaid four directions shown in FIG. 2b, the corresponding vectors are listed below:

$$d_1[n]=\{p[m_0+0, n_0-3], \ldots, p[m_0, n_0], \ldots, p[m_0+0, n_0+3]\}$$

$$d_2[n]=\{p[m_0-3, n_0+3], \ldots, p[m_0, n_0], \ldots, p[m_0+3, n_0-3]\}$$

$$d_3[n]=\{p[m_0-3, n_0+0], \ldots, p[m_0, n_0], \ldots, p[m_0+3, n_0+0]\}$$

$$d_4[n]=\{p[m_0-3, n_0-3], \ldots, p[m_0, n_0], \ldots, p[m_0+3, n_0+3]\}$$

where $d_i[n]$ represents a vector that consists of brightness of all of the pixel dots located along the i-th direction, which includes seven values and the seven values corresponds to the dead pixel and every three pixel dots at each of the two sides of the dead pixel along the corresponding direction, respectively; $p[i, j]$ represents brightness of a pixel dot at the i-th row and the j-th column in the image data shown in FIG. 2b; and $p[m_0, n_0]$ represents brightness of the dead pixel in FIG. 2b.

For each direction, the changing trend of brightness of the pixel dots at one side of the dead pixel is referred to as a brightness changing trend from a distal pixel dot to a proximal pixel dot along a positive axis of the direction, and the changing trend of brightness of the pixel dots at the other side of the dead pixel is referred to as a brightness changing trend from a distal pixel dot to a proximal pixel dot along a negative axis of the direction.

For instance, for a first direction, the changing trends of brightness of the pixel dots at the two sides of the dead pixel include a brightness changing trend at a first side from a pixel dot at the $m_0$-th row and the $(n_0-3)$-th column to a pixel dot at the $m_0$-th row and the $(n_0-1)$-th column and a brightness changing trend at a second side from a pixel dot at the $m_0$-th row and the $(n_0+3)$-th column to a pixel dot at the $m_0$-th row and the $(n_0+1)$-th column.

In an embodiment of the present disclosure, the aforesaid brightness changing trend can be a brightness changing trend of pixel dots of a same channel. For example, for the aforesaid first direction, it can be carried out by the changing trends of brightness of pixel dots of a G channel at the two sides of the dead pixel.

In an embodiment, the changing trend of brightness of the pixel dots can be obtained by taking the derivative of brightness of the pixel dots. In an embodiment of the present disclosure, the changing trends of brightness of pixel dots at the two sides of the dead pixel can be estimated using an embodiment shown in FIG. 3, which may include actions at the following Blocks S301 and S302.

At Block S301, in a predetermined region and for each predetermined direction, a first brightness information of the pixel dots located at a first side of the dead pixel and having a channel different from the dead pixel is obtained and a second brightness information of the pixel dots located at a second side of the dead pixel and having a channel different from the dead pixel is also obtained. The first side and the second side are two sides of the dead pixel along the predetermined direction.

For instance, for the i-th direction, in $d_i[n]$, a brightness component corresponding to the dead pixel can be represented by $d_i[0]$. The first side may be a left side of the dead pixel (taking the first direction as an example), in which $d_i[-j]$ can be used to indicate the brightness of the j-th pixel dot at the left side of the dead pixel. Accordingly, the first brightness information of the pixel dots located at the first side of the dead pixel and having a channel different from the dead pixel includes $d_i[-3]$ (e.g., $p[m_0+0, n_0-3]$ with respect to the first direction) and $d_i[-1]$ (e.g., $p[m_0+0, n_0-1]$ with respect to the first direction). The second side may be a right side of the dead pixel, in which $d_i[-j]$ can be used to indicate the brightness of the j-th pixel dot at the right side of the dead pixel. Accordingly, the second brightness information of the pixel dots located at the second side of the dead pixel and having a channel different from the dead pixel includes $d_i[3]$ (e.g., $p[m_0+0, n_0+3]$ with respect to the first direction) and $d_i[1]$ (e.g., $p[m_0+0, n_0+1]$ with respect to the first direction).

At Block S302, a first brightness changing trend at the first side of the dead pixel is estimated according to the first brightness information and a second brightness changing trend at the second side of the dead pixel is estimated according to the second brightness information.

In an embodiment of the present disclosure, the derivative of the brightness information can be used to represent the brightness changing trend.

In an embodiment, for the i-th direction, the first brightness changing trend at the first side can be obtained from the following formula:

$$\partial_i[-1] = \frac{d_i[-1] - d_i[-3]}{2}.$$

The second brightness changing trend at the second side can be obtained from the following formula:

$$\partial_i[+1] = \frac{d_i[+1] - d_i[+3]}{2}.$$

where $\partial_i[-1]$ is the first brightness changing trend and $\partial_i[+1]$ is the second brightness changing trend.

In an embodiment of the present disclosure, for each direction, dead pixel brightness compensation values corresponding to the two sides of the dead pixel can be understood as below. A brightness compensation value corresponding to the first side is referred to as a value used to compensate the brightness of the dead pixel, determined according to the brightness changing trend at the first side of the dead pixel and the brightness information of the pixel dots located at the first side and having the same channel as the dead pixel. Correspondingly, a brightness compensation value corresponding to the second side is referred to as a value used to compensate the brightness of the dead pixel, determined according to the brightness changing trend at the second side of the dead pixel along the direction and the brightness information of the pixel dots located at the second side and having the same channel as the dead pixel.

Figure 4:
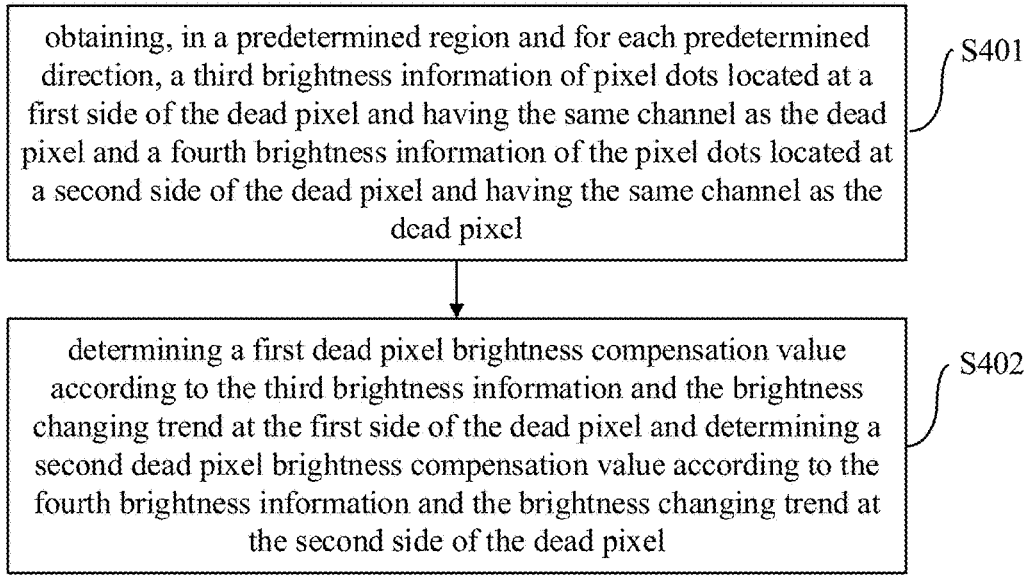
FIG. 4 is a flowchart of a method for compensating dead pixels of an image in accordance with another embodiment of the present disclosure.

In an embodiment of the present disclosure, the dead pixel brightness compensation values corresponding to the two sides of the dead pixel can be determined using an embodiment shown in FIG. 4, which may include actions at the following Blocks S401 and S402.

At Block S401, in the predetermined region and for each predetermined direction, a third brightness information of the pixel dots located at the first side of the dead pixel and having the same channel as the dead pixel is obtained and a fourth brightness information of the pixel dots located at the second side of the dead pixel and having the same channel as the dead pixel is also obtained.

For instance, for the i-th direction, the third brightness information of the pixel dots located at the first side of the dead pixel and having the same channel as the dead pixel includes $d_i[-2]$ (e.g., $p[m_0+0, n_0-2]$ with respect to the first direction), and the fourth brightness information of the pixel dots located at the second side of the dead pixel and having the same channel as the dead pixel includes $d_i[+2]$ (e.g., $p[m_0+0, n_0+2]$ with respect to the first direction).

At Block S402, a first dead pixel brightness compensation value is determined according to the third brightness information and the brightness changing trend at the first side of the dead pixel and a second dead pixel brightness compensation value is determined according to the fourth brightness information and the brightness changing trend at the second side of the dead pixel.

In an embodiment, for the i-th direction, the first dead pixel brightness compensation value (represented by $d_i[-]$) can be obtained from the following formula:

$$d_i[-]=d_i[-2]+\partial_i[-1].$$

The second dead pixel brightness compensation value (represented by $d_i[+]$) can be obtained from the following formula:

$$d_i[+]=d_i[+2]+\partial_i[+1].$$

At Block S102, a first difference between the brightness changing trends at the two sides of the dead pixel along each predetermined direction is determined and a second difference between the dead pixel brightness compensation values at the two sides of the dead pixel along each predetermined direction is also determined.

In an embodiment of the present disclosure, the difference between the brightness changing trends at the two sides of the dead pixel can be represented by an absolute value of the difference between the derivatives of the brightness information at the two sides of the dead pixel.

In an embodiment, for the i-th direction, the first difference $\Delta\partial_i$ between the brightness changing trends at the two sides of the dead pixel can be represented by:

$$\Delta\partial_i=|\partial_i[-1]-\partial_i[+1]|.$$

For the i-th direction, the second difference $\delta_i$ between the dead pixel brightness compensation values at the two sides of the dead pixel can be represented by:

$$\delta_i=|d_i[-]-d_i[+]|.$$

At Block S103, according to the first difference and the second difference obtained along each predetermined direction, a weighting factor of a corresponding predetermined direction is determined.

In an embodiment of the present disclosure, for each direction, one compensation value for the dead pixel can be determined according to the dead pixel brightness compensation values corresponding to the two sides of the dead pixel along a corresponding direction. Accordingly, a plurality of corresponding compensation values can be obtained according to the data obtained along a plurality of predetermined directions. However, predictions of the brightness of the dead pixel made by the brightness changing trends at the two sides of the dead pixel along the respective directions may be different. For example, the brightness of the dead pixel may be consistent with the brightness changing trends in only one direction, or may relate to the brightness changing trends in several directions, or relate to the brightness changing trends in all directions. Therefore, a result of dead pixel compensation may not be accurate if the compensation values obtained along the respective directions are simply added up.

In an embodiment of the present disclosure, according to the first difference and the second difference corresponding to each predetermined direction, a weighting factor of a corresponding predetermined direction is determined. The smaller the first difference and the second difference, the smaller a corresponding weighting factor; the larger the first difference and the second difference, the larger a corresponding weighting factor.

Figure 5:
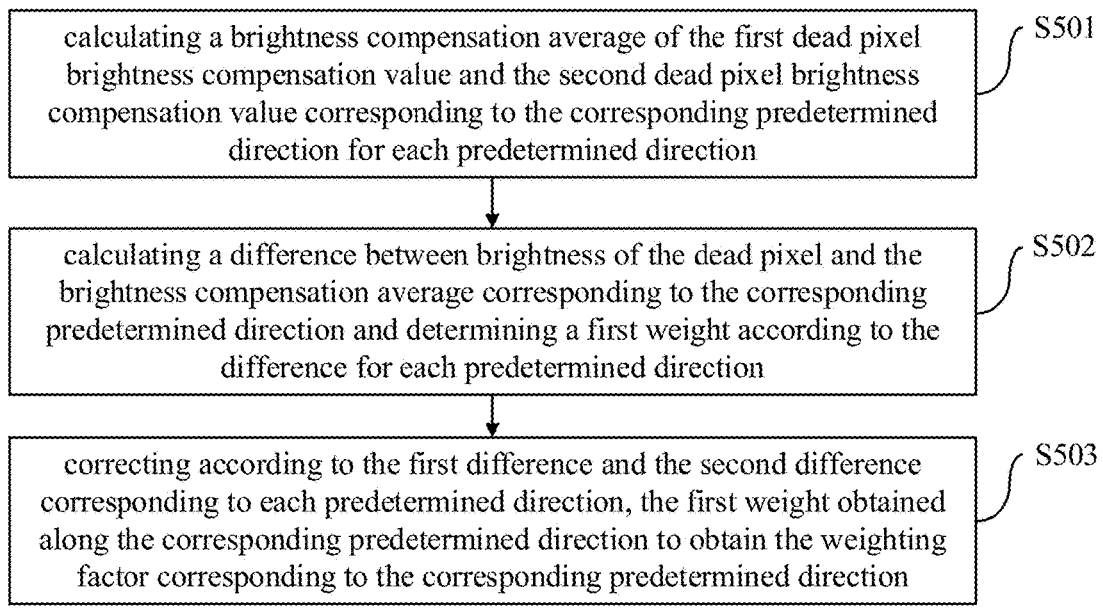
FIG. 5 is a flowchart of a method for compensating dead pixels of an image in accordance with another embodiment of the present disclosure.

In an embodiment of the present disclosure, Block S103 may include Blocks S501 to S503 as shown in FIG. 5.

At Block S501, for each predetermined direction, a brightness compensation average of the first dead pixel brightness compensation value and the second dead pixel brightness compensation value corresponding to the corresponding predetermined direction is calculated.

In an embodiment, for the i-th direction, a corresponding brightness compensation average is $$\frac{d_i[-]+d_i[+]}{2}.$$

At Block S502, for each predetermined direction, the difference between the brightness of the dead pixel and the brightness compensation average corresponding to the corresponding predetermined direction is calculated and a first weight is determined according to the difference.

In an embodiment, for the i-th direction, the difference $\partial\_abs_i$ between the brightness of the dead pixel and the brightness compensation average corresponding to the corresponding predetermined direction can be obtained from the following formula:

$$\partial\_abs_i = \left|p[m_0, n_0]-\left(\frac{d_i[-]+d_i[+]}{2}\right)\right|,$$

where $p[m_0, n_0]$ is the brightness of the dead pixel.

After that, the first weight is determined according to $\partial\_abs_i$. In an embodiment, the first weight weights, corresponding to each $\partial\_abs_i$ may be determined according to a preset rule. In an embodiment, the preset rule of the first weight depends on the needs in practical applications. In an embodiment of the present disclosure, the first weight may be set to be small if the brightness of the dead pixel is higher than that of other pixel dots and $\partial\_abs_i$ is large; the first weight may be set to be large if the brightness of the dead pixel is lower than that of other pixel dots and is small. Accordingly, a look-up table weight_table$_i$ constructed by $\partial\_abs_i$ and the first weight corresponding to each direction may be established, where weight_table$_i$=LUT(index, $\partial\_abs_i$,weights$_i$).

At Block S503, according to the first difference and the second difference corresponding to each predetermined direction, the first weight obtained along the corresponding predetermined direction is corrected to obtain a weighting factor corresponding to the corresponding predetermined direction.

The first difference, the second difference, and the first weight are representative of effects on the dead pixel compensation in aspects of the difference between compensation values at the two sides of the dead pixel, the difference between brightness changing trends at the two sides of the dead pixel, and the difference between the brightness and the dead pixel and the compensation value, respectively. In order to increase accuracy of the dead pixel compensation, the embodiments of the present disclosure generate the weighting factor based on the first difference, the second difference, and the first weight. In such a way, the dead pixel compensation takes into consideration the aforesaid three aspects and thus the compensation result is improved.

In an embodiment, different algorithms may be chosen to calculate the weighting factor using the first difference, the second difference, and the first weight according to a situation of the dead pixel on the image sensor.

In an embodiment of the present disclosure, for the i-th direction, the first difference, the second difference, and the first weight corresponding to the direction may be multiplied together to obtain a corresponding weighting factor.

It is noted that in other embodiments of the present disclosure, the correction may be carried out by other algorithms. For example, a correction coefficient is obtained by calculations on the first difference and the second difference based on a preset algorithm, and the first weight is multiplied by the correction coefficient to obtain a corresponding weighting factor.

At Block S104, the dead pixel brightness compensation values corresponding to the two sides of the dead pixel along each predetermined direction are subjected to a weighting calculation based on the weighting factor to obtain a compensation result for the dead pixel.

In an embodiment of the present disclosure, an average of the dead pixel brightness compensation values corresponding to the two sides of the dead pixel along each predetermined direction may be calculated. Then, the average of the dead pixel brightness compensation values corresponding to the two sides of the dead pixel along each predetermined direction is subjected to the weighting calculation based on the weighting factor, and the dead pixel is compensated according to the calculation result.

In an embodiment, the compensation result $\hat{p}[m_0, n_0]$ for the dead pixel may be obtained from the following formula:

$$\hat{p}[m_0, n_0] = \sum_i \left( \zeta_i \left( \frac{d_i[-] + d_i[+]}{2} \right) \right) / \sum \zeta_i,$$

where $\frac{d_i[-] + d_i[+]}{2}$ is an average of the dead pixel brightness compensation values corresponding to the two sides of the dead pixel along the i-th predetermined direction, and $\zeta_i$ is a weight corresponding to the i-th predetermined direction.

In the method for compensating dead pixels of an image in accordance with the embodiments of the present disclosure, the brightness changing trends at the two sides of the dead pixel along each predetermined direction are estimated as well as their difference. Also, the dead pixel brightness compensation values corresponding to the two sides of the dead pixel are estimated as well as their difference. The two differences are used to determine the weighting factor used to compensate the dead pixel. The compensation values corresponding to the respective directions are subjected to the weighting calculation based on the weighting factor. The obtained compensation result and other pixel dots are varied more uniform and the effect is better. The effect is outstanding especially in compensation and correction on a static dead pixel in a complex picture.

Figure 6A:
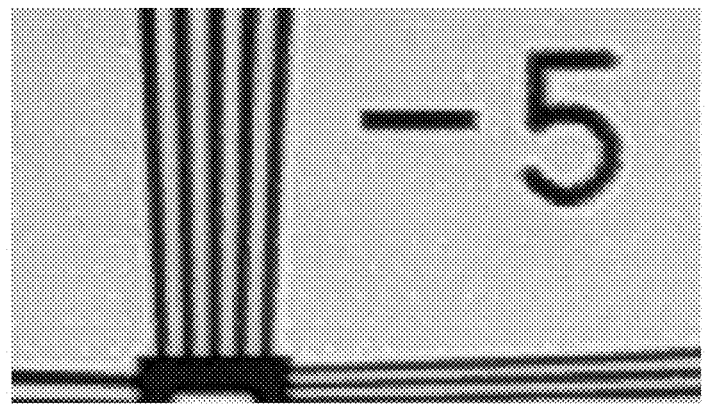
FIG. 6a is a schematic diagram illustrating image data that is to be compensated in accordance with an embodiment of the present disclosure.
Figure 6B:
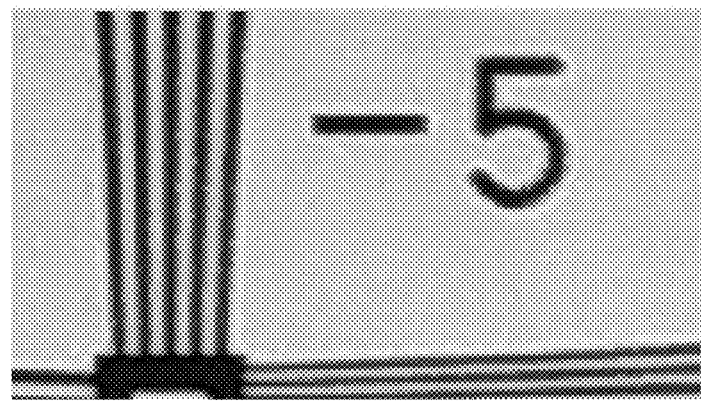
FIG. 6b is a schematic diagram illustrating a compensation result of the image data shown in FIG. 6a using a traditional approach.
Figure 6C:
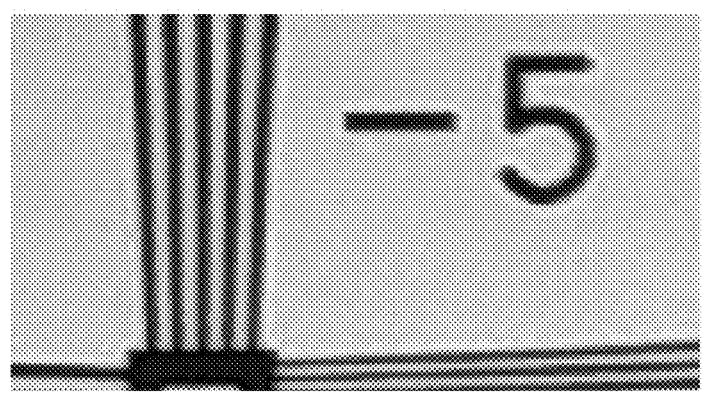
FIG. 6c is a schematic diagram illustrating a compensation result of the image data shown in FIG. 6a in accordance with an embodiment of the present disclosure.

For instance, FIG. 6a is a schematic diagram illustrating image data that is to be compensated in accordance with an embodiment of the present disclosure; FIG. 6b is a schematic diagram illustrating a compensation result of the image data shown in FIG. 6a using a traditional approach; FIG. 6c is a schematic diagram illustrating a compensation result of the image data shown in FIG. 6a in accordance with an embodiment of the present disclosure. It can be known that in the compensation result shown in FIG. 6b, a large amount of dead pixels are remained around the number "5" and the five straight lines. However, in the compensation result shown in FIG. 6c in accordance with the embodiment of the present disclosure, the number of dead pixels around the number "5" and the five straight lines is greatly reduced. Therefore, it can be known from above comparison that the dead pixel compensation method of the embodiment of the present disclosure can significantly improve a compensation effect for the dead pixels.

It is noted that in the embodiments of the present disclosure, the afore-mentioned plural predetermined directions are illustrated by the directions shown in FIG. 2b. However, in practical applications, the present disclosure is not limited to the directions shown in FIG. 2b. The illustrated directions can be extended to other directions, which are not further detailed herein.

The present disclosure also provides a device for compensating dead pixels of an image.

Figure 7:
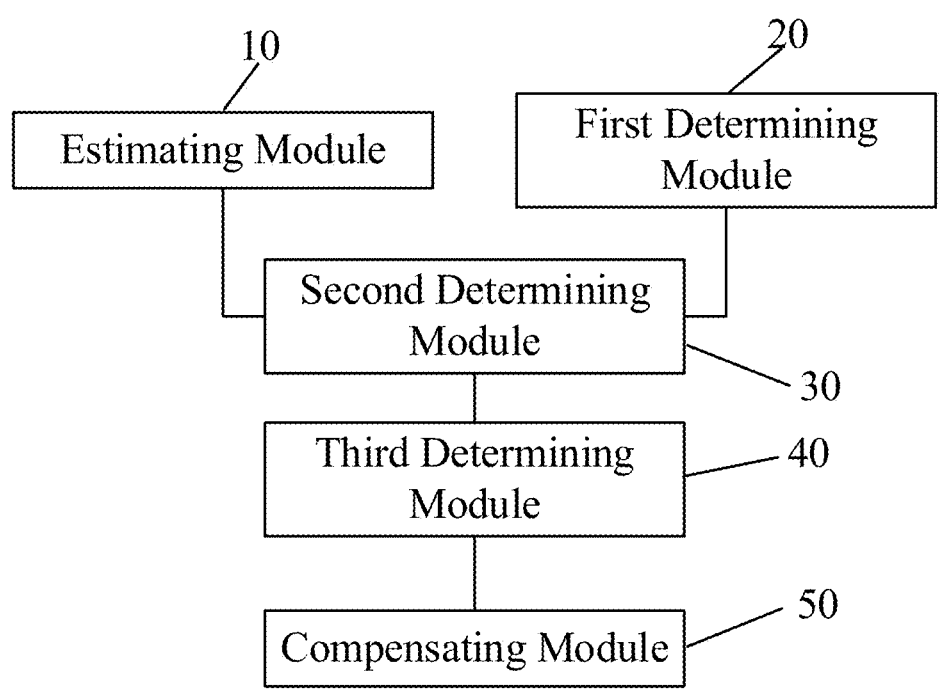
FIG. 7 is a schematic structural diagram illustrating a device for compensating dead pixels of an image in accordance with an embodiment of the present disclosure.

FIG. 7 is a schematic structural diagram illustrating a device for compensating dead pixels of an image in accordance with an embodiment of the present disclosure.

As shown in FIG. 7, the dead pixel compensation device of the embodiment of the present disclosure includes an estimating module 10, a first determining module 20, a second determining module 30, a third determining module 40, and a compensating module 50.

The estimating module 10 is configured to estimate brightness changing trends at two sides of a dead pixel for each predetermined direction in image data that is to be compensated.

The implementation of the estimating module 10 can be referred to the embodiment shown in FIG. 1.

In an embodiment of the present disclosure, the estimating module 10 is configured to obtain a first brightness information of the pixel dots located at a first side of the dead pixel and having a channel different from the dead pixel and obtain a second brightness information of the pixel dots located at a second side of the dead pixel and having a channel different from the dead pixel in a predetermined region and for each predetermined direction, in which the first side and the second side are two sides of the dead pixel along the predetermined direction, and to estimate a first brightness changing trend at the first side of the dead pixel according to the first brightness information and estimate a second brightness changing trend at the second side of the dead pixel is estimated according to the second brightness information.

Figure 3:
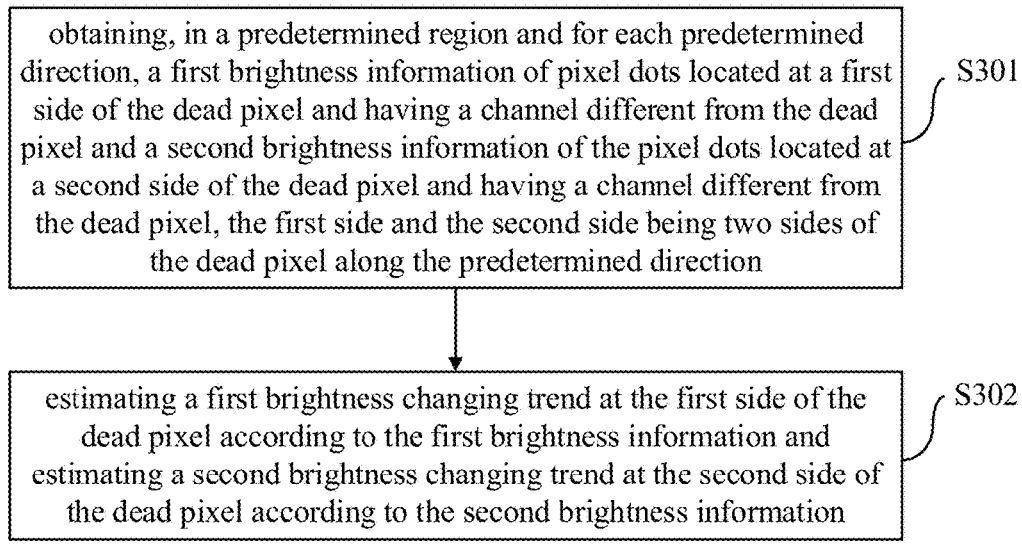
FIG. 3 is a flowchart of a method for compensating dead pixels of an image in accordance with another embodiment of the present disclosure.

The implementation about this can be referred to the embodiment shown in FIG. 3.

The first determining module 20 is configured to determine dead pixel brightness compensation values corresponding to the two sides of the dead pixel along the corresponding predetermined direction for each predetermined direction in the image data that is to be compensated.

The implementation of the first determining module 20 can be referred to the embodiment shown in FIG. 1.

In an embodiment of the present disclosure, the first determining module 20 is configured to obtain a third brightness information of the pixel dots located at the first side of the dead pixel and having the same channel as the dead pixel and obtain a fourth brightness information of the pixel dots located at the second side of the dead pixel and having the same channel as the dead pixel in the predetermined region and for each predetermined direction, and to determine a first dead pixel brightness compensation value according to the third brightness information and the brightness changing trend at the first side of the dead pixel and determine a second dead pixel brightness compensation value according to the fourth brightness information and the brightness changing trend at the second side of the dead pixel.

The implementation about this can be referred to the embodiment shown in FIG. 4.

The second determining module 30 is configured to determine a first difference between the brightness changing trends at the two sides of the dead pixel along each predetermined direction and determine a second difference between the dead pixel brightness compensation values at the two sides of the dead pixel along each predetermined direction.

The implementation of the second determining module 30 can be referred to the embodiment shown in FIG. 1.

The third determining module 40 is configured to determine according to the first difference and the second difference obtained along each predetermined direction, a weighting factor of a corresponding predetermined direction.

The implementation of the third determining module 40 can be referred to the embodiment shown in FIG. 1.

In an embodiment of the present disclosure, the third determining module 40 is configured to calculate a brightness compensation average of the first dead pixel brightness compensation value and the second dead pixel brightness compensation value corresponding to the corresponding predetermined direction for each predetermined direction, calculate the difference between the brightness of the dead pixel and the brightness compensation average corresponding to the corresponding predetermined direction and determine a first weight according to the difference for each predetermined direction, and correct according to the first difference and the second difference corresponding to each predetermined direction, the first weight obtained along the corresponding predetermined direction to obtain a weighting factor corresponding to the corresponding predetermined direction.

The implementation about this can be referred to the embodiment shown in FIG. 5.

The compensating module 50 is configured to subject the dead pixel brightness compensation values corresponding to the two sides of the dead pixel along each predetermined direction to a weighting calculation based on the weighting factor to obtain a compensation result for the dead pixel.

The implementation of the compensating module 50 can be referred to the embodiment shown in FIG. 1.

In an embodiment of the present disclosure, the compensating module 50 is configured to calculate an average of the dead pixel brightness compensation values corresponding to the two sides of the dead pixel along each predetermined direction, subject the average of the dead pixel brightness compensation values corresponding to the two sides of the dead pixel along each predetermined direction to the weighting calculation based on the weighting factor, and compensate the dead pixel according to the calculation result.

In the device for compensating dead pixels of an image in accordance with the embodiments of the present disclosure, the brightness changing trends at the two sides of the dead pixel along each predetermined direction are estimated as well as their difference. Also, the dead pixel brightness compensation values corresponding to the two sides of the dead pixel are estimated as well as their difference. The two differences are used to determine the weighting factor used to compensate the dead pixel. The compensation values corresponding to the respective directions are subjected to the weighting calculation based on the weighting factor. The obtained compensation result and other pixel dots are varied more uniform and the effect is better. The effect is outstanding especially in compensation and correction on a static dead pixel in a complex picture.

Figure 8:
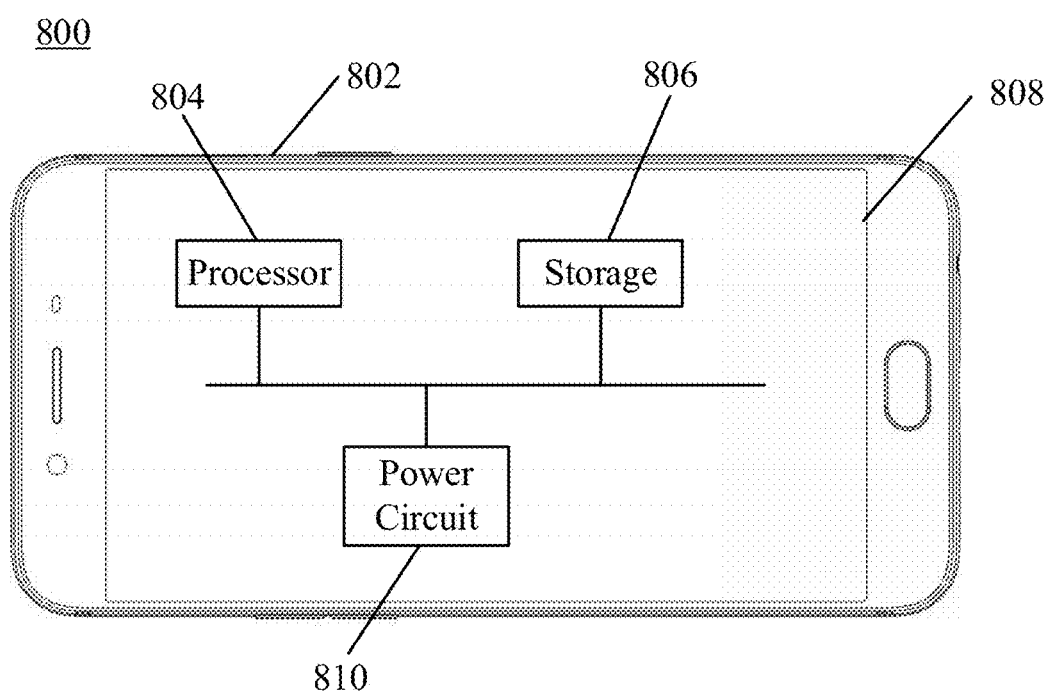
FIG. 8 is a block diagram illustrating an electronic apparatus in accordance with an embodiment of the present disclosure.

FIG. 8 is a block diagram illustrating an electronic apparatus 800 in accordance with an exemplary embodiment. For example, the electronic apparatus 800 can be a mobile phone, a game controller, a tablet device, a medical equipment, an exercise equipment, or a personal digital assistant (PDA).

Referring to FIG. 8, the electronic apparatus 800 may include one or a plurality of the following components: a housing 802, a processor 804, a storage 806, a circuit board 808, and a power circuit 810. The circuit board 808 is disposed inside a space defined by the housing 802. The processor 804 and the storage 806 are disposed on the circuit board 808. The power circuit 810 is configured to supply power to each circuit or device of the electronic apparatus 800. The storage 806 is configured to store executable program codes. By reading the executable program codes stored in the storage 806, the processor 804 runs a program corresponding to the executable program codes to execute the dead pixel compensation method of any one of the afore-mentioned embodiments.

The processor 804 typically controls overall operations of the electronic apparatus 800, such as the operations associated with display, telephone calls, data communications, camera operations, and recording operations. The processor 804 may include one or more processor 804 to execute instructions to perform actions at all or part of the blocks in the above described methods. Moreover, the processor 804 may include one or more modules which facilitate the interaction between the processor 804 and other components. For instance, the processor 804 may include a multimedia module to facilitate the interaction between the multimedia component and the processor 804.

The storage 806 is configured to store various types of data to support the operation of the electronic apparatus 800. Examples of such data include instructions for any application or method operated on the electronic apparatus 800, contact data, Phonebook data, messages, pictures, video, etc. The storage 806 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power circuit 810 supplies power to various components of the electronic apparatus 800. The power circuit 810 may include a power management system, one or more power sources, and any other component associated with generation, management, and distribution of power for the electronic apparatus 800.

In exemplary embodiments, the electronic apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the storage 806, executable by the processor 804 of the electronic apparatus 800 for performing the above-described methods. For example, the non-transitory computer-readable storage medium may be a ROM, a random access memory (RAM), a CD-ROM, a magnetic tape, a floppy disc, an optical data storage device, and the like.

Other embodiments of the disclosure will be apparent to those skilled in the art from consideration of the specification and practice of the disclosure here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for compensating dead pixels of an image, comprising:
    obtaining a plurality of predetermined directions across a dead pixel in image data;
    estimating brightness changing trends at two sides of the dead pixel for each predetermined direction, and determining dead pixel brightness compensation values corresponding to the two sides of the dead pixel along a corresponding predetermined direction;
    determining a first difference between the brightness changing trends at the two sides of the dead pixel along each predetermined direction and a second difference between the dead pixel brightness compensation values at the two sides of the dead pixel along each predetermined direction;
    according to the first difference and the second difference obtained along each predetermined direction, determining a weighting factor corresponding to the corresponding predetermined direction; and
    subjecting the dead pixel brightness compensation values corresponding to the two sides of the dead pixel along each predetermined direction to a weighting calculation based on the weighting factor to obtain a compensation result for the dead pixel.

2. The method according to claim 1, wherein estimating the brightness changing trends at the two sides of the dead pixel for each predetermined direction comprises:
    obtaining, in a predetermined region and for each predetermined direction, a first brightness information of pixel dots located at a first side of the dead pixel and having a channel different from the dead pixel and a second brightness information of the pixel dots located at a second side of the dead pixel and having a channel different from the dead pixel, the first side and the second side being two sides of the dead pixel along the predetermined direction; and
    estimating a first brightness changing trend at the first side of the dead pixel according to the first brightness information, and estimating a second brightness changing trend at the second side of the dead pixel according to the second brightness information.

3. The method according to claim 1, wherein determining the dead pixel brightness compensation values corresponding to the two sides of the dead pixel along the corresponding predetermined direction comprises:
    obtaining, in a predetermined region and for each predetermined direction, a first brightness information of pixel dots located at a first side of the dead pixel and having the same channel as the dead pixel and a second brightness information of the pixel dots located at a second side of the dead pixel and having the same channel as the dead pixel; and
    determining a first dead pixel brightness compensation value according to the first brightness information and the brightness changing trend at the first side of the dead pixel, and determining a second dead pixel brightness compensation value according to the second brightness information and the brightness changing trend at the second side of the dead pixel.

4. The method according to claim 3, wherein determining the weighting factor corresponding to the corresponding predetermined direction comprises:
    calculating a brightness compensation average of the first dead pixel brightness compensation value and the second dead pixel brightness compensation value corresponding to the corresponding predetermined direction for each predetermined direction;
    calculating a difference between brightness of the dead pixel and the brightness compensation average corresponding to the corresponding predetermined direction and determining a weight according to the difference for each predetermined direction; and
    according to the first difference and the second difference corresponding to each predetermined direction, correcting the weight obtained along the corresponding predetermined direction to obtain the weighting factor corresponding to the corresponding predetermined direction.

5. The method according to claim 1, wherein subjecting the dead pixel brightness compensation values corresponding to the two sides of the dead pixel along each predetermined direction to the weighting calculation based on the weighting factor to obtain the compensation result for the dead pixel comprises:
    calculating an average of the dead pixel brightness compensation values corresponding to the two sides of the dead pixel along each predetermined direction;
    subjecting the average of the dead pixel brightness compensation values corresponding to the two sides of the dead pixel along each predetermined direction to the weighting calculation based on the weighting factor and compensating the dead pixel according to the calculation result.

6. A device for compensating dead pixels of an image, comprising:
    a processor; and a memory connected with the processor, the memory comprising a plurality of program instructions executable by the processor configured to execute a method, the method comprising:
obtaining a plurality of predetermined directions across a dead pixel in image data;
estimating brightness changing trends at two sides of the dead pixel for each predetermined direction;
determining dead pixel brightness compensation values corresponding to the two sides of the dead pixel along a corresponding predetermined direction for each predetermined direction;
determining a first difference between the brightness changing trends at the two sides of the dead pixel along each predetermined direction and a second difference between the dead pixel brightness compensation values at the two sides of the dead pixel along each predetermined direction;
according to the first difference and the second difference obtained along each predetermined direction, determining a weighting factor corresponding to the corresponding predetermined direction; and
subjecting the dead pixel brightness compensation values corresponding to the two sides of the dead pixel along each predetermined direction to a weighting calculation based on the weighting factor to obtain a compensation result for the dead pixel.

7. The device according to claim 6, wherein estimating the brightness changing trends at the two sides of the dead pixel for each predetermined direction comprises: obtaining, in a predetermined region and for each predetermined direction, a first brightness information of pixel dots located at a first side of the dead pixel and having a channel different from the dead pixel and a second brightness information of the pixel dots located at a second side of the dead pixel and having a channel different from the dead pixel, the first side and the second side being two sides of the dead pixel along the predetermined direction, and estimating a first brightness changing trend at the first side of the dead pixel according to the first brightness information and estimating a second brightness changing trend at the second side of the dead pixel is estimated according to the second brightness information.

8. The device according to claim 6, wherein determining the dead pixel brightness compensation values corresponding to the two sides of the dead pixel along the corresponding predetermined direction comprises: obtaining, in a predetermined region and for each predetermined direction, a first brightness information of pixel dots located at a first side of the dead pixel and having the same channel as the dead pixel and a second brightness information of the pixel dots located at a second side of the dead pixel and having the same channel as the dead pixel, and determining a first dead pixel brightness compensation value according to the first brightness information and the brightness changing trend at the first side of the dead pixel and determining a second dead pixel brightness compensation value according to the second brightness information and the brightness changing trend at the second side of the dead pixel.

9. The device according to claim 8, wherein determining the dead pixel brightness compensation values corresponding to the two sides of the dead pixel along the corresponding predetermined direction comprises: calculating a brightness compensation average of the first dead pixel brightness compensation value and the second dead pixel brightness compensation value corresponding to the corresponding predetermined direction for each predetermined direction, calculating a difference between brightness of the dead pixel and the brightness compensation average corresponding to the corresponding predetermined direction and determining a weight according to the difference for each predetermined direction, and according to the first difference and the second difference corresponding to each predetermined direction, correcting the weight obtained along the corresponding predetermined direction to obtain the weighting factor corresponding to the corresponding predetermined direction.

10. The device according to claim 6, wherein subjecting the dead pixel brightness compensation values corresponding to the two sides of the dead pixel along each predetermined direction to the weighting calculation based on the weighting factor to obtain the compensation result for the dead pixel comprises: calculating an average of the dead pixel brightness compensation values corresponding to the two sides of the dead pixel along each predetermined direction, and subjecting the average of the dead pixel brightness compensation values corresponding to the two sides of the dead pixel along each predetermined direction to the weighting calculation based on the weighting factor and compensating the dead pixel according to the calculation result.

11. The device according to claim 6, further comprising a housing, a circuit board, and a power circuit, wherein the circuit board is disposed inside a space defined by the housing, the processor and the memory are disposed on the circuit board, the power circuit is configured to supply power to each circuit of the device.

12. A non-transitory computer-readable storage medium storing one or more instructions, which are executable by a device to implement a method for compensating dead pixels of an image, the method comprising:
estimating brightness changing trends at two sides of a dead pixel for each predetermined direction in image data that is to be compensated, and determining dead pixel brightness compensation values corresponding to the two sides of the dead pixel along a corresponding predetermined direction;
determining a first difference between the brightness changing trends at the two sides of the dead pixel along each predetermined direction and a second difference between the dead pixel brightness compensation values at the two sides of the dead pixel along each predetermined direction;
according to the first difference and the second difference obtained along each predetermined direction, determining a weighting factor corresponding to the corresponding predetermined direction; and
subjecting the dead pixel brightness compensation values corresponding to the two sides of the dead pixel along each predetermined direction to a weighting calculation based on the weighting factor to obtain a compensation result for the dead pixel.

13. The non-transitory computer-readable storage medium according to claim 12, wherein the estimating the brightness changing trends at the two sides of the dead pixel for each predetermined direction in the image data that is to be compensated comprises:
obtaining, in a predetermined region and for each predetermined direction, a first brightness information of pixel dots located at a first side of the dead pixel and having a channel different from the dead pixel and a second brightness information of the pixel dots located at a second side of the dead pixel and having a channel different from the dead pixel, the first side and the second side being two sides of the dead pixel along the predetermined direction; and estimating a first brightness changing trend at the first side of the dead pixel according to the first brightness information, and estimating a second brightness changing trend at the second side of the dead pixel according to the second brightness information.

14. The non-transitory computer-readable storage medium according to claim 12, wherein the determining the dead pixel brightness compensation values corresponding to the two sides of the dead pixel along the corresponding predetermined direction comprises:

obtaining, in a predetermined region and for each predetermined direction, a third brightness information of pixel dots located at a first side of the dead pixel and having the same channel as the dead pixel and a fourth brightness information of the pixel dots located at a second side of the dead pixel and having the same channel as the dead pixel; and determining a first dead pixel brightness compensation value according to the third brightness information and the brightness changing trend at the first side of the dead pixel, and determining a second dead pixel brightness compensation value according to the fourth brightness information and the brightness changing trend at the second side of the dead pixel.

15. The non-transitory computer-readable storage medium according to claim 14, wherein the determining according to the first difference and the second difference obtained along each predetermined direction, the weighting factor corresponding to the corresponding predetermined direction comprises:

calculating a brightness compensation average of the first dead pixel brightness compensation value and the second dead pixel brightness compensation value corresponding to the corresponding predetermined direction for each predetermined direction;

calculating a difference between brightness of the dead pixel and the brightness compensation average corresponding to the corresponding predetermined direction and determining a first weight according to the difference for each predetermined direction; and according to the first difference and the second difference corresponding to each predetermined direction, correcting the first weight obtained along the corresponding predetermined direction to obtain the weighting factor corresponding to the corresponding predetermined direction.

16. The non-transitory computer-readable storage medium according to claim 12, wherein the subjecting the dead pixel brightness compensation values corresponding to the two sides of the dead pixel along each predetermined direction to the weighting calculation based on the weighting factor to obtain the compensation result for the dead pixel comprises:

calculating an average of the dead pixel brightness compensation values corresponding to the two sides of the dead pixel along each predetermined direction;

subjecting the average of the dead pixel brightness compensation values corresponding to the two sides of the dead pixel along each predetermined direction to the weighting calculation based on the weighting factor and compensating the dead pixel according to the calculation result.

* * * * *